United States Patent [19]
Wiggins et al.

[11] Patent Number: 5,916,935
[45] Date of Patent: Jun. 29, 1999

[54] POLYMERIC THICKENERS FOR AQUEOUS COMPOSITIONS

[75] Inventors: Michael Wiggins, Lansdale, Pa.; Dipak Shah, Charlotte, N.C.; Reuben H. Grinstein, Tucson, Ariz.

[73] Assignee: Henkel Corporation, Gulph Mills, Pa.

[21] Appl. No.: 08/901,579

[22] Filed: Jul. 28, 1997

Related U.S. Application Data

[60] Provisional application No. 60/024,101, Aug. 27, 1996.
[51] Int. Cl.$^6$ ..................................................... C08J 3/02
[52] U.S. Cl. ............................................................. 523/335
[58] Field of Search ............................................ 523/335

[56] References Cited

U.S. PATENT DOCUMENTS

| | | | |
|---|---|---|---|
| 4,079,028 | 3/1978 | Emmons et al. | 260/29.6 NR |
| 4,138,381 | 2/1979 | Chang et al. | 260/29.6 TA |
| 5,130,369 | 7/1992 | Hughes et al. | 524/846 |
| 5,268,397 | 12/1993 | Larson | 522/97 |
| 5,380,800 | 1/1995 | Bender | 528/129 |
| 5,424,469 | 6/1995 | Jakobson | 554/227 |
| 5,466,719 | 11/1995 | Jakobson | 514/785 |
| 5,723,538 | 3/1998 | Fischer | 524/608 |

OTHER PUBLICATIONS

*Encyclopedia of Polymer Science and Engineering*, Second Edition, John Wiley & Sons, Inc., New York, NY, 1986, vol. 6, pp. 225–273.

*Encyclopedia of Polymer Science and Engineering*, John Wiley & Sons, Inc., New York, NY, 1988, vol. 12, pp. 28–43.

*Primary Examiner*—Paul R. Michl
*Attorney, Agent, or Firm*—Wayne C. Jaeschke; John Daniel Wood; Henry E. Millson, Jr.

[57] ABSTRACT

A process of preparing a concentrate which is useful as a thickener for aqueous compositions is provided. The process comprises obtaining a solution of an associative thickener compound in an organic solvent capable of forming a low boiling azeotrope with water. The solution is essentially free of water at this point and is at a temperature above the boiling point of said low boiling azeotrope. Water is added to said solution and an azeotrope of water and said organic solvent is distilled. The rate of addition of water is sufficient to replace said azeotrope with water, but is insufficient to cause a second phase to form in the resulting mixture of said solution and said water. The process yields a concentrate of an associative thickener in water, which concentrate is essentially free of volatile organic solvents.

34 Claims, No Drawings

POLYMERIC THICKENERS FOR AQUEOUS COMPOSITIONS

BENEFIT OF EARLIER FILING DATE UNDER 37 CFR 1.78(A)(4)

This application claims the benefit of earlier filed and copending provisional application Ser. No. 60/024,101 filed on Aug. 27, 1996.

FIELD OF THE INVENTION

This invention relates to a process of preparing a concentrate of polymeric compounds which are useful as thickeners for aqueous compositions, especially emulsion polymer latexes.

BACKGROUND ART

Many aqueous systems require thickeners in order to be useful for various types of applications. Such aqueous-based systems as cosmetics, protective coatings for paper and metal, printing inks, and latex paints all require the incorporation of thickeners in order to have the proper rheological characteristics for their particular uses. Many substances useful as thickeners are known in the art. These include natural polymers such as casein and alginates, and synthetic materials such as cellulose derivatives, acrylic polymers, and polyurethane polymers.

Associative thickeners are so called because the mechanism by which they thicken may involve hydrophobic associations between the hydrophobic species in the thickener molecules and other hydrophobic surfaces, either on other thickener molecules, or on molecules in the system to be thickened. The different types of associative thickeners include, but are not limited to, polyurethanes, hydrophobically-modified alkali soluble emulsions, hydrophobically modified hydroxyethyl cellulose or other products, and hydrophobically modified polyacrylamides.

The molecular weight and HLB of these associative thickeners, which usually are water soluble or dispersible polymers, is chosen to be sufficiently high to impart desired rheological properties to an aqueous composition containing the thickener. Advantageously, the water-soluble polymer has a molecular weight sufficiently high such that a solution containing up to 2–3 weight percent of this polymer will exhibit a viscosity of at least 5,000, preferably at least 15,000, and most preferably at least 20,000 centipoises (as measured on a Brookfield viscometer with a number 3 spindle at 10 RPM at 25° C.). As explained above, a variety of polymeric materials may be used as a water-soluble polymer, including cellulose ethers, polyacrylamides, sulfonated polystyrenes, copolymers of acrylic acid, hydroxypropylated guar, and the like.

Such polymers tend to be quite viscous when present in high concentration in an aqueous solution. Reduction of viscosity with added agents, e.g., organic cosolvents is possible, but the use of viscosity reducing agents can pose environmental problems (e.g., contribute to volatile organic compound content) or performance problems (e.g., added surfactants can detract from the performance of coating of a latex which contains the thickener).

SUMMARY OF THE INVENTION

This invention relates to process of preparing a concentrate which is useful as a thickener for aqueous compositions, particularly latex paints, comprising:

obtaining a solution of an associative thickener compound in an organic solvent capable of forming a low boiling azeotrope with water, said solution being essentially free of water, at a temperature above the boiling point of said low boiling azeotrope, adding water to said solution and distilling an azeotrope of water and said organic solvent, wherein the rate of addition of water is sufficient to replace said azeotrope with water, but is insufficient to cause a second phase to form in the resulting mixture of said solution and said water.

It has been found that if the rate of water addition is too low, e.g., all of the water added is allowed to distill as the azeotrope, the resulting mixture will become too viscous to be handled, and that if the rate of water addition is too fast, an oil-in-water emulsion will form (as evidenced by a milky appearance, typically accompanied by an increase in viscosity making the mixture too viscous to be handled and an increase in volume due to foaming). The oil-in-water emulsion makes distillation of the organic solvent extremely difficult, if not impractical. Thus, the rate of water addition should be controlled to at least replace the azeotrope formed, but to maintain the bulk of the polymer in true solution. The product is typically essentially free of volatile organic solvents (e.g., none as measured by ASTM Method D2369-90).

Preferred associative thickener compounds have the formula I:

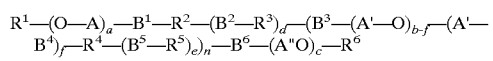

wherein:

$R^1$ and $R^6$ are monovalent hydrophobic groups independently selected from the group consisting of an aliphatic group, a substituted aliphatic group, an aromatic group, and a substituted aromatic group;

$R^2$ and $R^4$ are independently selected from the group consisting of aliphatic, substituted aliphatic, aromatic, or substituted aromatic radicals, each radical being divalent or trivalent;

$R^3$ and $R^5$ are independently selected from hydrogen, lower alkyl and lower aralkyl;

$B^1$, $B^2$, $B^3$, $B^4$, $B^5$, and $B^6$ are linking groups independently selected from the group consisting of an oxygen atom (to form the ether linkage —O—), a carboxylate group (to form an ester linkage $R^2$—C(O)—O— and/or $R^4$—C(O)—O—), an amino group (to form the amine linkage $R^2$—N(R)— and or $R^4$—N(R)—, wherein R is hydrogen, lower alkyl, lower aralkyl, or lower acyl), and an amido group (to form the amide linkage $R^2$—N(R)—C(O)— and/or $R^4$—N(R)—C(O)—, wherein R is hydrogen, lower alkyl, lower aralkyl, or lower acyl);

each of a, b, c, d, e, f, and n are integers, wherein each of a and c are independently any integer from greater than 20 to about 200; b is any integer from greater than 20 to about 450; d, e, and f are zero or 1; and n is any integer from 1 to about 5; and each of A, A', and A" is independently an ethylene, 1,2-propylene, 1,2-butylene unit or combinations thereof.

In preferred compounds, each of $R^1$ and $R^6$ is independently an aliphatic, substituted aliphatic, aromatic, or substituted aromatic radical having from 4 to about 50 carbon atoms; each of $B^1$–$B^6$ is an oxygen atom; $R^2$ and $R^4$ are both either propanetriyl or meta-xylyl; d and e are either (i) both zero (e.g., when $R^2$ and $R^4$ are both meta-xylyl) or (ii) both 1 and $R^3$ and $R^5$ are hydrogen, methyl or benzyl (e.g., when $R^2$ and $R^4$ are both propanetriyl); f is zero; each of A, A', and A" are ethylene, n is 1, b is from about 50 to about 450, more preferably from about 90 to about 450, and the values of a and c independently range from about 50 to about 150.

DETAILED DESCRIPTION OF THE PREFERRED EMBODIMENTS

While this invention may be useful in the context of a wide variety of the associative thickeners discussed above, the preferred associative thickeners for use herein are described as follows. In regard to formula I, the abbreviations A, A', and A" stand for the ethylene group (—$CH_2CH_2$—), the 1,2-propylene group —($CH_2CH$ ($CH_3$)—), or the 1,2-butylene group (—$CH(CH_2CH_3)$ $CH_2$—) or combinations thereof. Each of the subscripts a, b, c, f, and n are independently any integer as set forth above. One of ordinary skill in the art will appreciate that for mixtures of pure compounds, the subscripts a, b, c, f, and n will have non-integer values to reflect the fact that they represent the average degree of polymerization, e.g., n is from 0.5 to 4.5, preferably 0.5 to 1.5.

$R^2$ and $R^4$ are aliphatic, substituted aliphatic, aromatic, or substituted aromatic radical having a valence of from 2 or 3. Such aliphatic radicals include any di- or trivalent: (a) straight chain and branched alkyl radicals having from 2 to about 50 carbon atoms (preferably divalent or trivalent alkylene radicals having from 2 to 10 carbon atoms); (b) cycloalkyl radicals having from 4 to about 20 carbon atoms; (c) straight chain and branched alkenyl radicals having from 2 to about 40 carbon atoms; (d) cycloalkenyl radicals having from 5 to about 20 carbon atoms; (e) straight chain and branched alkynyl radicals having from 2 to about 30 carbon atoms; cycloalkynyl radicals having from 6 to about 20 carbon atoms; and (f) aralkyl radicals (i.e., alkyl radicals having aromatic groups as pendent substituents or linking alkylene groups) having at least 2 aliphatic carbon atoms along with an aromatic group, e.g., meta-xylyl wherein methylene groups are linked by a benzenoid group). Aliphatic radicals also include those above-mentioned aliphatic radicals which contain one or more heteroatoms substituted for one or more hydrogen atoms. The heteroatoms include the halogens, nitrogen, sulfur, oxygen, and phosphorus or groups of heteroatoms such as nitro, sulfonic acid, $C_{1-10}$ alkyl sulfonate ester, sulfoxide, sulfone, phosphoryl, trihalomethyl, and the like. For purposes of this invention, it is understood that aliphatic includes cycloaliphatic and heterocycloaliphatic wherein the heteroatoms are nitrogen, oxygen, sulfur, and phosphorus.

An aromatic radical is any benzenoid or non-benzenoid aromatic radical having a valence of 2 to 8. A non-benzenoid aromatic radical includes carbocyclic and heterocyclic aromatic radicals. For purposes of this invention, a substituted aromatic radical is any benzenoid or non-benzenoid aromatic radical having a valence of from 2 to 6 wherein one or more hydrogen atoms is replaced by an atom or a group of atoms other than hydrogen including the halogens, nitrogen, sulfur, oxygen, and phosphorus or groups of heteroatoms such as nitro, sulfonic acid, $C_{1-10}$ alkyl sulfonate ester, sulfoxide, sulfone, phosphoryl, trihalomethyl, and the like.

The abbreviations NP, DNP, LA, and TD stand for nonylphenoxy, dinonylphenoxy, lauryl, and tridecyl, respectively. $R^1$ and $R^6$ are monovalent radicals, typically having from about 6 to about 50 carbon atoms. The use of a hydrophobic alcohol to form the ends of the compound of formula I described above results in the formation of hydrophobic ether residues as $R^1$ and $R^6$. A hydrophobic group is any group which contributes to the water insolubility of the ether residue. Unsubstituted aliphatic groups having at least 6 carbon atoms, aromatic groups having 6 or more carbon atoms and groups which contain both aliphatic and aromatic moieties are hydrophobic. Examples of useful hydrophobic ether residues include but are not limited to, tolyl, hexyl, ethylphenyls, heptyl, cumyl, propylphenyls, octyl, butylphenyls, nonylphenyls, pentylphenyls, decyl, isohexylphenyls, n-hexylphenyls, n-undecyl, heptylphenyls, lauryl, octylphenyls, isononylphenyls, n-nonylphenyls, tetradecyl, decylphenyls, n-undecylphenyls, hexadecyl, isododecylphenyls, n-dodecylphenyls, stearyl, n-tetradecylphenyls, hexadecylphenyls, and isooctadecylphenyls. Preferred hydrophobes are the nonylphenyl, dinonylphenyl, lauryl, and tridecyl groups.

The use of the term "lower" to modify "alkyl" shall mean an alkyl group having from 1 to about 4 carbon atoms, e.g., methyl, ethyl, n-propyl, isopropyl, and tert-butyl. Further, the term "lower" when used to modify "aralkyl" shall mean an alkyl group having from 1 to about 4 carbon atoms substituted with a benzenoid radical, and the term "lower" when used to modify "acyl" shall mean a carbonyl terminated lower alkyl or lower aralkyl radical.

Each of A, A', and A" groups of formula I represent an ethylene, 1,2-propylene, 1,2-butylene unit or combinations thereof such that each of $(A—O)_a$, $(A'—O)_b$ and $(A"—O)_c$ is a water soluble, or water dispersible polyether group. The water solubility or water dispersibility of a polyether group is a function of its molecular structure and/or its molecular weight. For example, an ethyleneoxy (EO) homopolymer having a molecular weight of about 20,000 daltons or less is water soluble while a water soluble propyleneoxy (PO) homopolymer has a molecular weight of less than about 700 daltons. The structure of an EO-PO copolymer must be such that it contains at least about 50 wt % of ethyloxy groups to be water soluble. The structure-property relationships of EO and PO polyethers is described in the *Encyclopedia of Polymer Science and Engineering,* Second Edition, vol. 6, pp. 225–273, (John Wiley and Sons, Inc., 1986), while those of poly PO are described in vol. 6, page 300. In preferred compounds, the A, A', and A" groups consist essentially of ethylene groups, the value of b in formula I above is preferably from about 50 to about 450, more preferably from about 90 to about 450, and the values of a and c preferably range from about 50 to about 150.

The compounds according to the invention are polymeric materials which can be made by any process within the purview of those having ordinary skill in the art. A preferred method is a two-step process, the first step of which comprises forming a mixture of compounds of the following formulas:

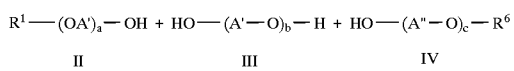

$$R^1—(OA')_a—OH + HO—(A'—O)_b—H + HO—(A"—O)_c—R^6$$
$$\text{II} \qquad\qquad \text{III} \qquad\qquad \text{IV}$$

wherein all symbols are as set forth above and under conditions which cause at least a portion of the terminal hydrogen atoms of the hydroxyl groups shown above to ionize leaving alkoxide oxygen atoms. These conditions can be brought about by adding to the mixture a strong base, for example an alkali or alkaline earth metal lower alkyl alkoxide, e.g., sodium methoxide. Of course, when B is an amino or amido group, the terminal hydroxyl of the compounds of formulas I, II, and III should be replaced by an amine nitrogen having the appropriate substituents to introduce the desired B and R groups into the molecule. Examples of such amine functional compounds useful to introduce an amine group are the polyoxyethyleneamine and polyoxypropyleneamines (available under the tradename JEFFAMINE®, from Texaco Chemical Company, Houston, Tex.). Compounds of formula II and IV, but wherein the terminal hydroxy is replaced by an amino nitrogen can be prepared by one of ordinary skill in the art. For example, compounds of formula II and IV can be subjected to a catalyzed ammoniation (with ammonia, or a lower alkylamine or lower acyl amide) for replacement of the hydroxyl, or to a capping of the hydroxyl with epichlorohydrin followed by ammoniation (with ammonia, or a lower alkylamine or lower acylamide) of the resulting glycidal group.

The second step of the two-step process comprises forming a mixture of the product of step one in further admixture with a member selected from the group of a di-etherifying agent, a tri-etherifying agent, a di-esterifying agent, a tri-esterifying agent, and a mixture of two or more of such members. (Of course, when the compounds are amines or amides rather than hydroxyl compounds, the reaction is an alkylation or amidation reaction. To simplify the following description, references below to etherifying agents or esterifying agents in general should be construed as applicable to alkylating agents and amidifying agents, respectively.) This basic reaction can be represented by:

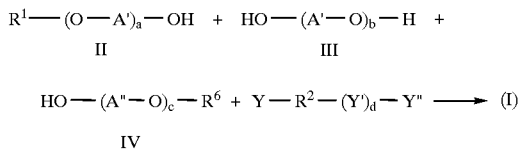

wherein Y, Y' and Y" are leaving groups in the case of etherifying agents or carboxy-functional groups in the case of esterifying agents. (Of course, the hydroxyl groups of the compounds of formulas II, III, and IV are amino or amido groups when B is to be such a linking group. Further, $Y-R^2-(Y')_d-Y"$ can also be an acetal, ketal, or orthoester, in which case Y and Y" are lower alkoxy groups which leave in a transacetalization, transketalization, or transorthoesterification, respectively. This leads to a compound of formula I in which B is an ether linking group from these special classes of ethers, i.e., acetals, ketals or orthoesters.)

It should be noted that when all B linkages are to be, for example, ether linkages, then only a di-etherifying agent and/or a tri-etherifying agent will be used to the exclusion of any esterifying agents. Likewise, when all B linkages are to be ester linkages, then only a di-esterifying agent and/or a tri-esterifying agent will be used to the exclusion of any etherifying agents. Similarly, if both d and e are to be zero (i.e., $R^2$ and $R^4$ are only divalent radicals), then only a di-etherifying agent and/or a di-esterifying agent will be used to the exclusion of any tri-etherifying agents and tri-esterifying agents. Such etherifying (or alkylating) and esterifying (or amidifying) agents are capable of reacting with the hydroxyl (or amine or amide groups) or alkoxide oxygens of the reactants II, III and IV, above. These agents will thus introduce the divalent or trivalent radicals $R^2$ and $R^4$ into the molecule. Examples of etherifying (or alkylating) agents are alkyl halides, e.g., divalent compounds (e.g., alpha, alpha'-dichloro-meta-xylene) that introduce a divalent $R^2$ and/or $R^4$ group into the molecule, e.g., through the same mechanism as a classical Williamson ether (or amine alkylation) synthesis. When $R^2$ and/or $R^4$ are to be aromatic radicals, it may be convenient to employ a di-halo-aromatic compound (e.g., di-bromo-benzene) which can be derivatized to the corresponding mono-Grignard reagent and reacted with the diol reactant of formula III, above (which will cap the diol with ether groups $R^2$ and/or $R^4$ at each end of the diol to form, in the case of di-bromo-benzene, a bis-bromo-phenyl ether of the diol). This capped adduct can then be sequentially derivatized in a second Grignard reaction, the product of which can be reacted with reactants of formulas 11 and IV above, to give a compound of formula I wherein $R^2$ and/or $R^4$ are aromatic groups.

Further examples of etherifying agents include epihalohydrin compounds, (e.g., those of the formula $X-CH_2-CH-(O)-CH_2$ wherein X is a leaving group, for example a halogen, e.g., chlorine which forms a chloride ion as the leaving group) or a precursor of an epihalohydrin (e.g., a compound of the formula $X-CH_2-CH-(OR^3)-CH_2-X'$, wherein X' is a leaving group). When this precursor is used, the epihalohydrin, may be formed, at least in part, in situ, or the alkoxide moieties formed in step one may displace both the X and X' groups in an $S_N2$ reaction. When $R^3$ and/or $R^5$ are lower alkyl, then the epihalohydrin compound may be an ether having the formula $X-CH_2-CH-(OR^3)-CH_2-X'$, wherein X and X' are leaving groups and $R^3$ is a lower alkyl group (i.e., $C_1$ to $C_4$ alkyl, preferably methyl). Alternatively, the reaction mixture may also contain an alkylating agent of the formula $X"-R^3$ (e.g., methyl chloride or benzyl chloride) that can react with the alkoxide radical (or hydroxyl group) formed by opening of the oxirane ring of the epihalohydrin. This alkylating agent would preferably be added with the epihalohydrin compound to reduce the opportunity of a side reaction with the alkoxide compounds which introduce the $R^1$ and $R^6$ groups into the molecule. Of course, if $R^3$ and $R^5$ are different, then a second epihalohydrin ether having the formula $X-CH_2-CH-(OR^5)-CH_2-X'$ and/or a second alkylating agent having the formula $X"-R^5$ must be employed to introduce the $R^5$ group into the molecule.

Examples of esterifying agents include di-basic and tri-basic organic acids, and reactive derivatives thereof, e.g., acid halides, acid anhydrides, and/or lower esters of such di-basic and tri-basic organic acids (all of which have carboxy-functional groups capable of reacting with the hydroxyl or alkoxide functional compounds of formulas II, III, IV). Because branching is generally undesirable (as discussed below in the context of the epihalohydrin etherifying agents), if an esterifying agent is employed, it is preferably only di-basic, e.g., succinic acid or phthalic anhydride. If a tri-basic acid is employed, a lower alkanol (e.g., methanol) can be added to the reaction mixture so that $R^3$ and/or $R^5$ will be lower alkyl. (This addition of a lower alkanol is similar to the chain stopping effect discussed below in the context of alkyl halides used with epihalohydrins). The reaction conditions for the esterification reaction will of course differ from those appropriate for an etherification reaction. Esterification reactions with polybasic acids are discussed in the *Encyclopedia of Polymer Science and Engineering*, vol. 12, pp. 28–43 (John Wiley and Sons, Inc., New York, N.Y., 1988), the disclosure of which is incorporated herein by reference. The presence of ester linkages is less desirable when the compound will be used in aqueous compositions that are not at an essentially neutral pH (e.g., from a pH of about 6.5 to about 7.5) Because many latex compositions are formulated to have an alkaline pH (e.g., about pH 9 to about pH 11), compounds of formula I wherein all B linkages are ether linkages are preferred for their resistance to hydrolysis.

The ratios of the reactants of formulas 11, III, and, IV may vary, but will generally range within 20 mole % to 45 mole % each of the compounds of formula 11 and IV (if $R^1$ and $R^6$ are the same, then the amount of the single reactant will, thus, be 40 mole % to 90 mole %) and 3 mole % to 60 mole %, preferably 10 mole % to 60 mole %, of the compound of formula III. The amount of the etherifying or esterifying compound that is then reacted with the alkoxides may also vary, but will generally range from about 0.25:1 to about 1.5:1.0 (preferably about 0.8:1 to 1.2:1) equivalents of etherifying agent or esterifying agent (a divalent agent having two equivalents per mole) to hydroxyl equivalent weights of the reactants of formulas 11 (having one equivalent per mole), III (having two equivalents per mole), and IV (having one equivalent per mole).

It is believed that compositions which contain predominantly compounds of formula I are superior thickeners compared to compositions which contain compounds wherein $R^3$ and/or $R^5$ are not hydrogen, lower alkyl, or lower aralkyl, but are larger organic groups. Such larger organic groups can result from the reaction of a second molecule of epichlorohydrin with, e.g., the intermediate alkoxide compound of the formula:

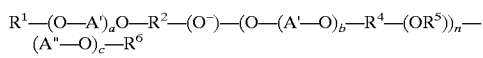

$R^1$—(O—A')$_a$O—$R^2$—(O$^-$)—(O—(A'—O)$_b$—$R^4$—(OR$^5$))$_n$—(A"—O)$_c$—$R^6$ and that this second molecule of epichlorohydrin can react, or may already have reacted, with the alkoxide $R^1$—(O—A')$_a$—O$^-$ (or $R^6$—(O—A")$_6$—O$^-$). In this case, a compound will be formed which has a similar structure to the compounds of formula I, but in which $R^3$ will then have the formula:

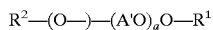

$R^2$—(O—)—(A'O)$_a$O—$R^1$ which yields a molecule with significant branching in its molecular structure. Of course, such branching can also occur at $R^4$ wherein $R^5$ is similarly replaced by the reaction product of a second molecule of epichlorohydrin and an alkoxide. (If a tri-esterifying agent is used, then the branching will result from reaction of the third carboxyl group with one of the reactants of formulas II, III, and IV.) This branching is believed to be detrimental to the performance of the molecule as a thickener for latex compositions. Thus, techniques to reduce this branching and produce compositions comprised predominantly of compounds of formula I should be employed in preparing the compounds of this invention.

Techniques to reduce branching include maintaining a comparatively low concentration of free epichlorohydrin in the reaction mixture. This can be done by using less than the stoichiometric amount of epichlorohydrin or by slow addition of the stoichiometric amount of epichlorohydrin. In the former case, there will be excess alkoxide present that should be recovered and recycled to maintain an efficient production process. In the latter case, slow addition of the epichlorohydrin will reduce the rate of product throughput in the reactor vessel.

Another useful technique is to introduce a reactant which will compete with the epichlorohydrin in the branching reaction. For example, water or an alkylating agent can react with the alkoxide group of the intermediate alkoxide compound set forth above. If water reacts with the alkoxide intermediate, branching is inhibited because the alcohol group is not as reactive with free epichlorohydrin as the alkoxide group of the alkoxide intermediate. Typical concentrations of water in the reaction medium range from 100 ppm to 2000 ppm water in the reaction solvent. If a lower alkyl alkylating agent reacts with the alkoxide intermediate, the alkoxide is capped with a lower alkyl group, thus preventing reaction (i.e., a sort of chain stopping effect) with free epichlorohydrin or the reaction product of epichlorohydrin with the hydrophobe alkoxide $R^1$—(O—A')$_a$—O$^-$ and/or $R^6$—(O—A")$_6$—O$^-$.

The reaction to produce the associative thickener is accomplished in the presence of a solvent for the reactants and the reaction product. In the context of this invention, such a solvent will be an organic solvent that is chemically inert with respect to the reactants and which will form a low boiling azeotrope with water at the pressure chosen for the distillation of the azeotrope. Such an azeotrope is one which boils at a temperature below the a boiling points of both the organic solvent and water. Typically, the organic solvent will be a hydrocarbon solvent, i.e., one consisting solely of carbon and hydrogen atoms, or an oxygenated hydrocarbon solvent, e.g., one consisting solely of carbon, hydrogen, and oxygen and having less than one oxygen atom per carbon atom. Preferred organic solvents are the higher alkanes, e.g., hexane, heptane, or nonane, aromatic hydrocarbons, e.g., benzene, toluene, or m-xylene, and ketones, e.g., 2-butanone, 2-pentanone, or 2 heptanone. The reaction product will, thus, be a solution of the associative thickener in organic solvent. The amount of organic solvent will typically provide a solution at a solids content of about 10% to about 80% by weight, more typically about 20% to about 60% by weight. The solution of associative thickener and water will be at a temperature above the boiling point of the low boiling azeotrope that will form at the chosen distillation pressure from the organic solvent and the added water. It will typically also be at or below the boiling point of the organic solvent and the water to keep either of these from flashing off. Thus, if the reaction to form the associative thickener is above all three of those temperatures, the reaction mixture containing the reaction product can be cooled to a temperature that is above the boiling point of the low boiling azeotrope that will form at the chosen distillation pressure from the organic solvent and the added water, but no higher than the boiling points of water and the organic solvent at that pressure. It is also possible to cool the reaction product after the reaction and reheat to a temperature above the boiling point of the low boiling azeotrope that will form at the chosen distillation pressure. Such reheating is inefficient from the standpoint of energy consumption (i.e., cooling and reheating wastes the heat stored in the hot reaction product), but reheating may be desirable if storage of the reaction product in organic solvent solution is desired prior to preparation of the concentrate. The pressure within the vessel during the distillation of the azeotrope can be ambient pressure, i.e., atmospheric, or an elevated or reduced pressure may be employed, provided the azeotrope is still a low boiling azeotrope at the pressure chosen. The pressure is preferably atmospheric and the preferred solvent is toluene.

Water is added to said solution and collection of the azeotrope of water and said organic solvent is begun. The rate of addition of water is adjusted so the rate of addition of water is sufficient to replace said azeotrope with water. This rate of addition should also take into account any reflux of the azeotrope. In other words, if not all of the azeotrope is collected as distillate, the water in that portion of the azeotrope that is returned to the mixture must be counted as water that is added to the mixture. If the rate of addition of water is too slow, the solids content of the mixture will become so great that the viscosity of the mixture will become unstirrable.

The rate of addition of water must be insufficient to cause a second phase to form in the resulting mixture of said solution and said water. It has been found that if the rate of water addition is too fast, an oil-in-water emulsion will form. The presence of an oil-in-water emulsion can be detected by the milky appearance of such an emulsion. The presence of the oil-in-water emulsion makes distillation of the organic solvent extremely difficult, if not impractical. Thus, the rate of water addition should be controlled to at least replace the azeotrope formed, but to maintain the bulk of the polymer in true solution. Typically, water should be added to the solution of the reaction product at a rate of about 0.1 to about 1.0 parts per one hundred parts of reaction product solution per minute, more typically from about 0.2 to about 0.5 parts per one hundred parts of reaction product solution per minute (and there is essentially no reflux of azeotrope to return distilled water to the mixture, i.e., essentially all azeotrope vapor is collected as distillate). The azeotrope can be treated to separate the water from the organic solvent, e.g., by decanting the organic solvent when it is immiscible with water, and the separated water can be reused as all or part of the water added to the solution of associative thickener in organic solvent.

It has been found that, as azeotrope is collected as distillate, the temperature of the reaction mixture will fall as a result of the cooling provided by the evaporation of the azeotrope, even if the set point of the heating medium is maintained at about the boiling point of the water. It is preferred to allow the temperature of the reaction mixture to fall to about the boiling point of the azeotrope, e.g., with toluene and at atmospheric pressure, the temperature will fall to about 85° C. After the temperature has fallen and most of the organic solvent has been removed, the temperature will begin to rise again. It has further been found that once the temperature begins to rise again, the rate of water addition can be increased, e.g., typically to a rate between about 0.5 parts and 1.5 parts per hundred parts of reaction product solution per minute, more typically about 0.75 to about 1.25 parts, without the formation of an oil-in-water emulsion.

When the level of organic solvent in the mixture has been reduced to the desired level, e.g., typically less than about 0.5% by weight, more typically less than about 0.1 % by weight, and most typically less than about 0.05% by weight, distillation is discontinued (unless distillation of water is desired to raise the solids content of the product). Generally, the process of this invention results in a product having a lower residual solvent as compared to simple vacuum distillation of the organic solvent alone, i.e., not as an azeotrope. The solids content of the product can be adjusted by the distillation of water from the mixture or the addition of water after distillation is discontinued. The final solids content of the concentrate will typically be about 20% by weight to about 70% by weight, more typically 25% to about 50%, even more typically about 25% by weight to about 35% by weight. A surfactant could be added to the concentrate to reduce the viscosity of the concentrate and thus allow higher solids. The concentrate will typically have a viscosity of less than about 15,000 cps (measured at 25° C. with a Brookfield Thermosel viscometer with a 3# spindle) more typically from about 2,500 cps to about 7,500 cps, and most typically about 4,000 cps to about 6,000 cps. Thickener concentrate products according to the invention can be sold commercially as aqueous-based compositions containing from about 35% to about 40% by weight thickener and having Brookfield viscosities ranging from about 400–20,000 cps. The thickeners according to the invention afford commercial products which are higher in solids and are easier to handle because of their lower viscosities.

Aqueous compositions comprised of thickeners according to the invention are also part of the invention. These compositions are comprised of water and a thickening-effective amount of one or more compounds of formula I. A thickening-effective amount is any amount required to bring the viscosity of the aqueous composition within the range desired for the intended application, e.g., a Brookfield viscosity of from about 3,000 to about 5,000 cps (spindle #3, @ 30 r.p.m.). This amount will typically be from about 1 to about 50% by weight of compounds according to the invention.

It is an advantage of this invention that an aqueous concentrate according to the invention need not contain a viscosity modifier which is a compound, e.g., one selected from the group consisting of a liquid polyol, a liquid ethoxylated or propoxylated $C_{1-8}$ alcohol, or a liquid ethoxylated or propoxylated $C_{1-8}$ carboxylic acid. It is within the broadest scope of the invention to add a viscosity modifier to the concentrate, but such an addition is not preferred. A liquid polyol is any compound having two or more —OH groups which is a liquid at room temperature, examples of which include but are not limited to ethylene glycol, 1,2-propylene glycol, 1,3-propylene glycol, 1,2-butylene glycol. A liquid ethoxylated or propoxylated $C_{1-8}$ alcohol is any aliphatic alcohol ethoxylated or propoxylated to any degree of ethoxylation or propoxylation and which is a liquid. Compounds in which the —OH group of the liquid ethoxylated or propoxylated $C_{1-8}$ alcohol is etherified with a $C_{1-4}$ alkyl group are also included in this group. A liquid ethoxylated or propoxylated $C_{1-8}$ carboxylic acid is any aliphatic carboxylic acid ethoxylated or propoxylated to any degree of ethoxylation or propoxylation and which is a liquid. Specific viscosity modifiers include butoxy triglycol (triethylene glycol monobutyl ether), butyl carbitol (diethylene glycol monobutyl ether), or 1,2-propylene glycol. Any such compounds which contribute to the volatile organic content of the concentrate should be avoided.

The thickeners according to the invention are very efficient in increasing the high shear and low shear viscosities of latexes or latex paint compositions into which they have been incorporated. Latexes are emulsions or dispersions of water insoluble polymers in water. Latex paint compositions typically contain at least an aqueous emulsion or dispersion of a water insoluble polymer, a pigment, a pigment dispersant, a thickener to control the viscosity and improve the leveling and flow characteristics of the paint, and a preservative which is effective in controlling the growth of microorganisms. Present paint industry standards call for a latex paint having an ICI viscosity of from about 0.8 to about 3.0 poise and a Stormer viscosity of from about 90 to about 110 KU. The ICI viscosity is a high shear viscosity and is measured on the ICI (Research Equipment Limited) Cone and Plate Viscosimeter at a shear rate of about 10,000 $sec^{-1}$. The Stormer viscosity is given in Krebs Units (KU) and is measured according to ASTM D662-81. Examples of the latexes which can be thickened with the thickeners according to the invention are those disclosed in U.S. Pat. No. 4,079,028 at column 12, line 64, to column 14, line 7, the entire contents of which are incorporated herein by reference.

The thickening ability of the compounds according to the invention can vary with the type of substance to be thickened. For example, some compounds may be very efficient at thickening acrylic latexes and not as efficient at thickening styrene-acrylic latexes while others may exhibit the opposite behavior. In addition, the thickening ability of a particular compound may also change when that compound is used in a paint formulation as opposed to a composition comprising only latex and water.

For most commercial applications, a latex is thickened by adding a sufficient amount of an aqueous composition according to the invention to a latex to bring the ICI viscosity into the 0.8 to 3.0 poise range and the Stormer viscosity into the 95 to 105 KU. Typically this amount will be in the range of from about 0.1% to about 10% of the thickener according to the invention by weight of latex polymer solids and preferably between 1% and 3% by weight of latex polymer solids. The following example is meant to illustrate, but not limit, the invention.

EXAMPLE 1

To a reactor equipped with a stirrer, nitrogen inlet tube, and a distillation head, add 36.8 parts by weight of tridecyl alcohol ethoxylate (nominal 100 ethyleneoxy units per mole of ethoxylate), 22 parts by weight of polyethylene glycol having a molecular weight of about 8,000 grams/mole and 40 parts by weight of toluene. To this mixture, added 1 part by weight of an aqueous solution containing 50% by weight sodium hydroxide. The contents of the reactor are then heated to azeotropically distill off most of the water with stirring and nitrogen gas sparging. The conditions of distillation should be such that about 0.1 to about 0.15 % by weight of water remain in the toluene solution. The solution is then cooled to 80° C. after which 0.75 parts by weight of epichlorohydrin is added. The reaction mixture is then maintained at 80° C. for two hours. The temperature is then raised to about 100° C. and then allowed to react until the viscosity is about 880 cps (as measure by Brookfield Thermosel at 70° C. with #3 LV spindle). The epoxide titration should be approximately zero. (A 4.0 gram aliquot of the reaction mixture and 4 grams of tetraethylammonium bromide can be dissolved in 50 ml of glacial acetic acid and the resulting solution titrated with a 0.1036 N HClO$_4$ in glacial acetic acid solution to a methyl violet end point for the amount of epoxide (epoxy titration). The reaction mixture is then neutralized to a substantially neutral pH (about pH 7) with 0.5 parts by weight of 70% aqueous glycolic acid.

The reactor set temperature is then set to 100° C. and water is added at a rate of 0.2 to 0.5 parts per minute. A toluene/water azeotrope should start to distill immediately and is collected. If the mixture foams so as to fill the reactor, water addition should be discontinued until the foam subsides. The temperature of the mixture should drop to 80–85° C. When the temperature reaches this range, the rate of water is then increased to 1 part per minute. The temperature should rise to 100° C. when most of the toluene has been removed. Maintain distillation and water addition for one hour after temperature reaches 100° C. Adjust solids of product to 30% by distillation of water after water addition is complete or continuing water addition after distillation is complete.

What is claimed is:

1. A process of preparing a concentrate which is useful as a thickener for aqueous compositions comprising:

obtaining a solution of an associative thickener compound in an organic solvent capable of forming a low boiling azeotrope with water, said solution being essentially free of water, at a temperature above the boiling point of said low boiling azeotrope, adding water to said solution and distilling an azeotrope of water and said organic solvent, wherein the rate of addition of water is sufficient to replace said azeotrope with water, but is insufficient to cause a second phase to form in the resulting mixture of said solution and said water;

wherein said associative thickener is comprised of a compound of the formula:

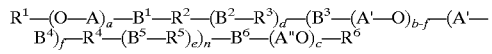

wherein:

$R^1$ and $R^6$ are monovalent hydrophobic groups independently selected from the group consisting of an aliphatic group, a substituted aliphatic group, an aromatic group, and a substituted aromatic group;

$R^2$ and $R^4$ are independently selected from the group consisting of aliphatic, substituted aliphatic, aromatic, or substituted aromatic radicals, each radical being divalent or trivalent;

$R^3$ and $R5$ are independently selected from hydrogen, lower alkyl and lower aralkyl;

$B^1$, $B^2$, $B^3$, $B^4$, $B^5$, and $B^6$ are linking groups independently selected from the group consisting of an oxygen atom, a carboxylate group, an amino group, and an amido group;

each of a, b, c, d, e, f, and n are integers, wherein each of a and c are independently any integer from greater than 20 to about 200; b is any integer from greater than 20 to about 450; d, e, and f are zero or 1; and n is any integer from 1 to about 5; and each of A, A', and A" is independently an ethylene, 1,2-propylene, 1,2-butylene unit or combinations thereof.

2. The process of claim 1 wherein said organic solvent is selected from the group consisting of hydrocarbon solvents and oxygenated hydrocarbon solvents.

3. The process of claim 1 wherein said organic solvent is selected from the group consisting of $C_B$–$C_g$ alkanes and benzene and $C_1$–$C_4$ alkyl-substituted benzenes.

4. The process of claim 1 wherein said organic solvent is toluene.

5. The process of claim 1 wherein said water is added to the solution, at least initially at a rate of from about 0.1 to about 1.0 parts per one hundred parts of reaction product solution per minute.

6. The process of claim 1 wherein said water is added to the solution, at least initially at a rate of from about 0.2 to about 0.5 parts per one hundred parts of reaction product solution per minute.

7. The process claimed in claim 1 wherein there is essentially no reflux of azeotrope to return distilled water to the mixture.

8. The process of claim 1 wherein the temperature of the reaction mixture falls to about the boiling point of the azeotrope after the beginning of addition of said water.

9. The process of claim 8 wherein the rate of water addition is increased after said temperature falls to the boiling point of said azeotrope and begins to rise therefrom.

10. The process of claim 9 wherein said increased rate is between about 0.5 parts and 1.5 parts per hundred parts of reaction product solution per minute.

11. The process of claim 9 wherein said increased rate is between about 0.75 to about 1.25 parts.

12. The process of claim 1 wherein the level of organic solvent in said mixture is reduced to less than about 0.5% by weight.

13. The process of claim 1 wherein the level of organic solvent in said mixture is reduced to less than about 0.05% by weight.

14. The process of claim 1 wherein the solids content of the product of said process is from about 20% by weight to about 70% by weight.

15. The process of claim 1 wherein the solids content of the product of said process is from about 25% by weight to about 35% by weight.

16. The process of claim 1 wherein the viscosity of the product of said process is less than about 15,000 cps, more typically from about 2,500 cps to about 7,500 cps, and most typically about 4,000 cps to about 6,000 cps.

17. The process of claim 1 wherein each of $B^1$, $B^2$, $B^3$, $B^4$, $B^5$, and $B^6$ are oxygen atoms.

18. The process of claim 1 wherein each of $B^1$, $B^2$, $B^3$, $B^4$, $B^5$, and $B^6$ are carboxylate groups.

19. The process of claim 1 wherein f is 1 and each of $B^1$, $B^2$, $B^3$, $B^4$, $B^5$, and $B^6$ are amino groups or amido groups having the formula —N(R)—, wherein R is selected from the group consisting of hydrogen, lower alkyl, and lower acyl.

20. The process of claim 1 wherein d and e are each zero and $R^2$ and $R^4$ are both divalent radicals selected from the group consisting of alkylene groups having from 2 to 10 carbon atoms and aralkylene radicals having one benzenoid ring and from 1 to 10 alkylene carbon atoms.

21. The process of claim 1 wherein d and e are each 1 and $R^2$ and $R^4$ are both trivalent radicals selected from the group consisting of alkanetriyl groups having from 2 to 10 carbon atoms.

22. The process of claim 1 wherein each of $R^1$ and $R^6$ is independently an aliphatic, substituted aliphatic, aromatic, or substituted aromatic radical having from 10 to about 30 carbon atoms.

23. The process of claim 1 wherein each of d and e is 1 and each of $R^3$ and $R^5$ are hydrogen, methyl, or benzyl.

24. The process of claim 1 wherein each of A, A', and A" are ethylene.

25. The process of claim 1 wherein each of a and c are independently from about 50 to about 150.

26. The process of claim 1 wherein b is from about 90 to about 300.

27. The process of claim 1 wherein n is 1.

28. The process of claim 1 wherein $R^1$ and $R^6$ are the same and are selected from the group consisting of alkyl groups having from about 8 to about 15 carbon atoms and alkylphenyl groups wherein the alkyl groups have from about 6 to about 12 carbon atoms.

29. The process of claim 1 wherein each of $R^1$ and $R^6$ is independently an aliphatic, substituted aliphatic, aromatic, or substituted aromatic radical having from 10 to about 30 carbon atoms; $R^2$ and $R^4$ are both trivalent radicals selected from the group consisting of alkanetriyl groups having from 2 to 10 carbon atoms; d and e are each 1; $R^3$ and $R^5$ are hydrogen, methyl or benzyl; f is zero; each of $B^1$–$B^6$ is an oxygen atom; each of A, A', and A" are ethylene; a and c are independently from about 50 to about 150; b is from about 150 to about 300; and n is 1.

30. The process of claim 29 wherein $R^2$ and $R^4$ are both propanetriyl radicals.

31. The process of claim 1 wherein each of $R^1$ and $R^6$ is independently an aliphatic, substituted aliphatic, aromatic, or substituted aromatic radical having from 10 to about 30 carbon atoms; $R^2$ and $R^4$ are both divalent radicals selected from the group consisting of alkylene groups having from 2 to 10 carbon atoms and aralkylene radicals having one benzenoid ring and from 1 to 10 alkylene carbon atoms; d, e, and f are each zero; each of $B^1$–$B^6$ is an oxygen atom; each of A, A', and A" are ethylene; a and c are independently from about 50 to about 150; b is from about 150 to about 300; and n is 1.

32. The process of claim 31 wherein $R^2$ and $R^4$ are both meta-xylyl radicals.

33. The process of claim 1 wherein said solution of an associative thickener compound in an organic solvent capable of forming a low boiling azeotrope with water as obtained is about 10% to about 80% by weight of said associative thickener.

34. The process of claim 1 wherein said solution of an associative thickener compound in an organic solvent capable of forming a low boiling azeotrope with water as obtained is about 20% to about 60% by weight of said associative thickener.

* * * * *